(12) United States Patent
Yang et al.

(10) Patent No.: US 10,112,272 B2
(45) Date of Patent: Oct. 30, 2018

(54) MANUFACTURING METHOD OF VAPOR CHAMBER

(71) Applicant: ASIA VITAL COMPONENTS CO., LTD., New Taipei (TW)

(72) Inventors: Hsiu-Wei Yang, New Taipei (TW); Fu-Kuei Chang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 168 days.

(21) Appl. No.: 15/052,880

(22) Filed: Feb. 25, 2016

(65) Prior Publication Data
US 2017/0246712 A1    Aug. 31, 2017

(51) Int. Cl.
*B23P 15/26*    (2006.01)
*B21D 53/02*    (2006.01)

(52) U.S. Cl.
CPC ........... *B23P 15/26* (2013.01); *B23P 2700/09* (2013.01)

(58) Field of Classification Search
None
See application file for complete search history.

(56) References Cited

U.S. PATENT DOCUMENTS

| | | | | |
|---|---|---|---|---|
| 4,024,620 A | * | 5/1977 | Torcomian | B23P 15/26 156/257 |
| 4,339,929 A | * | 7/1982 | Fitzpatrick | F24J 3/081 165/45 |
| 4,871,623 A | * | 10/1989 | Hoopman | C25D 1/02 205/67 |
| 6,113,626 A | * | 9/2000 | Clifton | A61F 7/0097 607/104 |
| 6,381,846 B2 | * | 5/2002 | Insley | F28F 3/048 29/890.03 |
| 6,446,706 B1 | * | 9/2002 | Rosenfeld | F28D 15/0241 165/104.26 |
| 6,907,921 B2 | * | 6/2005 | Insley | F28F 3/048 165/166 |
| 7,765,811 B2 | * | 8/2010 | Hershberger | H01L 35/30 136/203 |
| 8,087,254 B2 | * | 1/2012 | Arnold | A41D 13/005 62/3.2 |

(Continued)

FOREIGN PATENT DOCUMENTS

| | | |
|---|---|---|
| TW | M505794 U | 7/2015 |
| TW | M513988 U | 12/2015 |

*Primary Examiner* — Ryan J Walters
*Assistant Examiner* — Lawrence Averick
(74) *Attorney, Agent, or Firm* — C. G. Mersereau; Nikolai & Mersereau, P.A.

(57) ABSTRACT

A manufacturing method of vapor chamber includes steps of: providing a first board body and a second board body; using mechanical processing to form a hooked section structure on one face of the first board body; using mechanical processing to form a hook section structure on one face of the second board body; and correspondingly mating the first and second board bodies with each other to make the hook section and the hooked section contact and hook and connect with each other and sealing the periphery of the first and second board bodies and vacuuming the first and second board bodies and filling therein a working fluid. According to the manufacturing method, the vapor chamber is manufactured without any additional support structure, but is still free from the problem of thermal expansion. Also, the vapor chamber can be thinned and lightweight.

6 Claims, 9 Drawing Sheets

(56) References Cited

U.S. PATENT DOCUMENTS

| | | | | |
|---|---|---|---|---|
| 9,476,651 B2* | 10/2016 | Thiagarajan | | F28D 15/02 |
| 9,513,064 B2* | 12/2016 | Cox | | H01L 23/367 |
| 2001/0016985 A1* | 8/2001 | Insley | | F28F 3/048 |
| | | | | 29/890.039 |
| 2002/0011330 A1* | 1/2002 | Insley | | F28F 3/048 |
| | | | | 165/133 |
| 2007/0017095 A1* | 1/2007 | Bourne | | B21F 27/00 |
| | | | | 29/890.03 |
| 2007/0240860 A1* | 10/2007 | Meyer, IV | | F28D 15/0233 |
| | | | | 165/104.26 |
| 2009/0000309 A1* | 1/2009 | Hershberger | | F25B 21/02 |
| | | | | 62/3.5 |
| 2009/0228082 A1* | 9/2009 | Ross, III | | A61F 7/02 |
| | | | | 607/107 |
| 2011/0000516 A1* | 1/2011 | Hershberger | | F25B 21/02 |
| | | | | 136/208 |
| 2011/0100608 A1* | 5/2011 | Huang | | F28D 15/0233 |
| | | | | 165/104.26 |
| 2012/0263904 A1* | 10/2012 | Costin, Sr. | | B29C 59/007 |
| | | | | 428/40.1 |
| 2014/0076995 A1* | 3/2014 | Wang | | G06F 1/20 |
| | | | | 239/145 |
| 2014/0133093 A1* | 5/2014 | Cox | | H01L 23/367 |
| | | | | 361/679.54 |
| 2014/0378037 A1* | 12/2014 | Yao | | B24D 11/02 |
| | | | | 451/536 |
| 2015/0075000 A1* | 3/2015 | Cox | | H01L 23/367 |
| | | | | 29/890.03 |
| 2016/0374231 A1* | 12/2016 | Cox | | H01L 23/367 |
| 2017/0138672 A1* | 5/2017 | Qu | | F28D 15/02 |
| 2017/0259201 A1* | 9/2017 | Freiler | | B01D 46/523 |

* cited by examiner

MANUFACTURING METHOD OF VAPOR CHAMBER

BACKGROUND OF THE INVENTION

1. Field of the Invention

The present invention relates generally to a manufacturing method of vapor chamber, and more particularly to a manufacturing method of vapor chamber, by which the vapor chamber is manufactured without any additional support structure, but is still free from the problem of thermal expansion. Therefore, the manufacturing cost is greatly lowered.

2. Description of the Related Art

The current mobile phones, personal computers, servers, communication chassis and other systems or devices have higher and higher operation performance. In this case, the heat generated by the internal calculation units of these systems or devices is greatly increased. Therefore, these systems or devices necessitate high-performance heat dissipation units to help in dissipating the heat. Most of the manufacturers select heat sinks, heat pipes, vapor chambers and the like heat dissipation components in cooperation with cooling fans to help in dissipating the heat. When it is necessary to dissipate heat by a large area, a vapor chamber is often selectively employed to absorb the heat in cooperation with a heat sink and cooling fan to forcedly heat dissipate the heat. These heat dissipation components must be tightly attached to each other so as to avoid thermal resistance. The vapor chamber is a flat plate body having an internal chamber for vapor-liquid circulation to dissipate heat. In order to prevent the flat vapor chamber from expanding or deforming under pressure or due to heating, multiple support column bodies are disposed in the chamber as support structures for supporting the vapor chamber.

The vapor chamber serves to transfer heat face to face. As aforesaid, multiple support column bodies are disposed in the chamber to prevent the vapor chamber from expanding or being flattened/deformed due to heating or under external pressure. In the manufacturing process, it is necessary to additionally manufacture the support column bodies so that the manufacturing time is prolonged and the manufacturing cost (for the support column bodies) is increased. Also, the thickness and weight of the vapor chamber are increased.

According to the above, the conventional vapor chamber has the following shortcomings:

1. Additional support structures are needed to support the vapor chamber.
2. The manufacturing cost is greatly increased.
3. The vapor chamber can be hardly thinned.
4. The vapor chamber has the problem of thermal expansion.

SUMMARY OF THE INVENTION

It is therefore a primary object of the present invention to provide a vapor chamber structure, which is free from any additional support structure.

It is a further object of the present invention to provide the above vapor chamber structure, which is manufactured at much lower cost.

It is still a further object of the present invention to provide the above vapor chamber structure, which is free from the problem of dry burn.

It is still a further object of the present invention to provide the above vapor chamber structure, which is free from the problem of thermal expansion.

It is still a further object of the present invention to provide the above vapor chamber structure, which can be effectively thinned.

It is still a further object of the present invention to provide a manufacturing method of vapor chamber, by which the vapor chamber is manufactured without any additional support structure.

It is still a further object of the present invention to provide the above manufacturing method of vapor chamber, by which the vapor chamber is manufactured at much lower cost.

It is still a further object of the present invention to provide the above manufacturing method of vapor chamber, in which the vapor chamber is free from the problem of dry burn.

It is still a further object of the present invention to provide the above manufacturing method of vapor chamber, in which the vapor chamber is free from the problem of thermal expansion.

It is still a further object of the present invention to provide the above manufacturing method of vapor chamber, in which the vapor chamber can be effectively thinned.

To achieve the above and other objects, the vapor chamber structure of the present invention includes a first board body, a second board body and a working fluid. The first board body has a first face and a second face. The second face has a hooked section. The second board body is assembled and connected with the first board body. The second board body has a third face and a fourth face. A chamber is defined between the third face and the second face. A hook section is disposed on the third face. The hook section and the hooked section can contact and hook/grasp and connect with each other. The working fluid is filled in the chamber.

To achieve the above and other objects, the manufacturing method of vapor chamber of the present invention includes steps of: providing a first board body and a second board body; using mechanical processing to form a hooked section structure on one face of the first board body; using mechanical processing to form a hook section structure on one face of the second board body; and correspondingly mating the first and second board bodies with each other to make the hook section and the hooked section contact and hook and connect with each other and sealing the periphery of the first and second board bodies and vacuuming the first and second board bodies and filling therein a working fluid.

To achieve the above and other objects, the manufacturing method of vapor chamber of the present invention includes steps of: providing a first board body and a second board body; pre-making a hooked section structure and a hook section structure; respectively attaching the hooked section structure and the hook section structure to one face of the first board body and one face of the second board body and overlaying the hooked section structure and the hook section structure on the first board body and the second board body; and correspondingly mating the first and second board bodies with each other to make the hook section and the hooked section contact and hook and connect with each other and sealing the periphery of the first and second board bodies and vacuuming the first and second board bodies and filling therein a working fluid.

According to the structural design of the present invention, the first face of the first board body can be attached to a heat source and a vapor-liquid circulation of the working fluid can be carried out in the chamber. Due to the structure of the hooked section, a stronger liquid conservation power is provided to avoid dry burn of the vapor chamber structure.

The hook section is directly formed on the third face of the second board body as a support structure of the vapor chamber structure of the present invention to provide support effect instead of the support structure in the conventional vapor chamber. This can save the cost of the support structure of the conventional vapor chamber. Also, the free end of the hook section has the form of a reverse hook so that the hook section can contact and hook and connect with the hooked section to provide a drag effect, whereby by means of the hook section, the first board body can drag the second board body to avoid thermal expansion problem taking place when the vapor chamber is heated.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
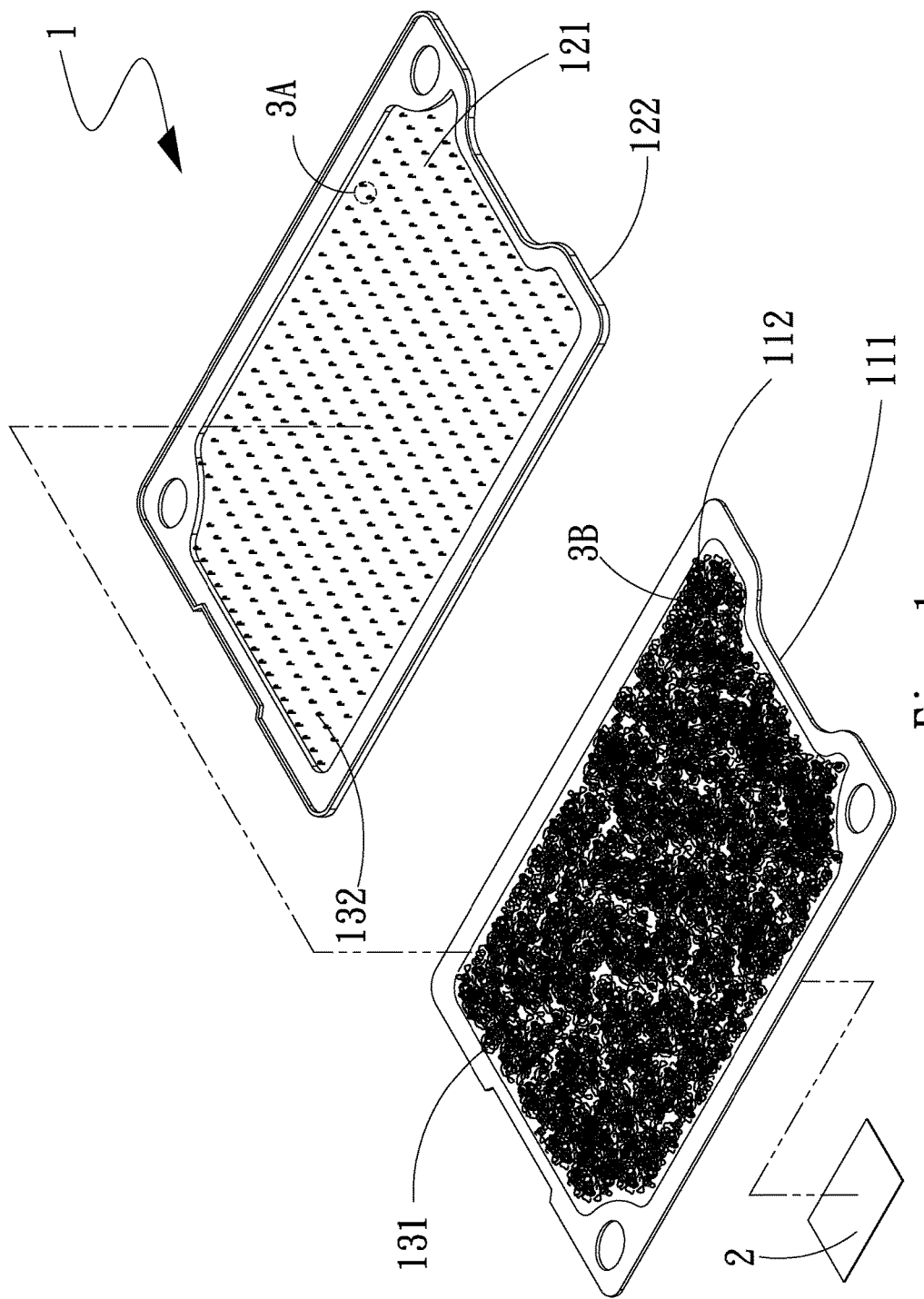
FIG. 1 is a perspective exploded view of a first embodiment of the vapor chamber structure of the present invention.
Figure 2:
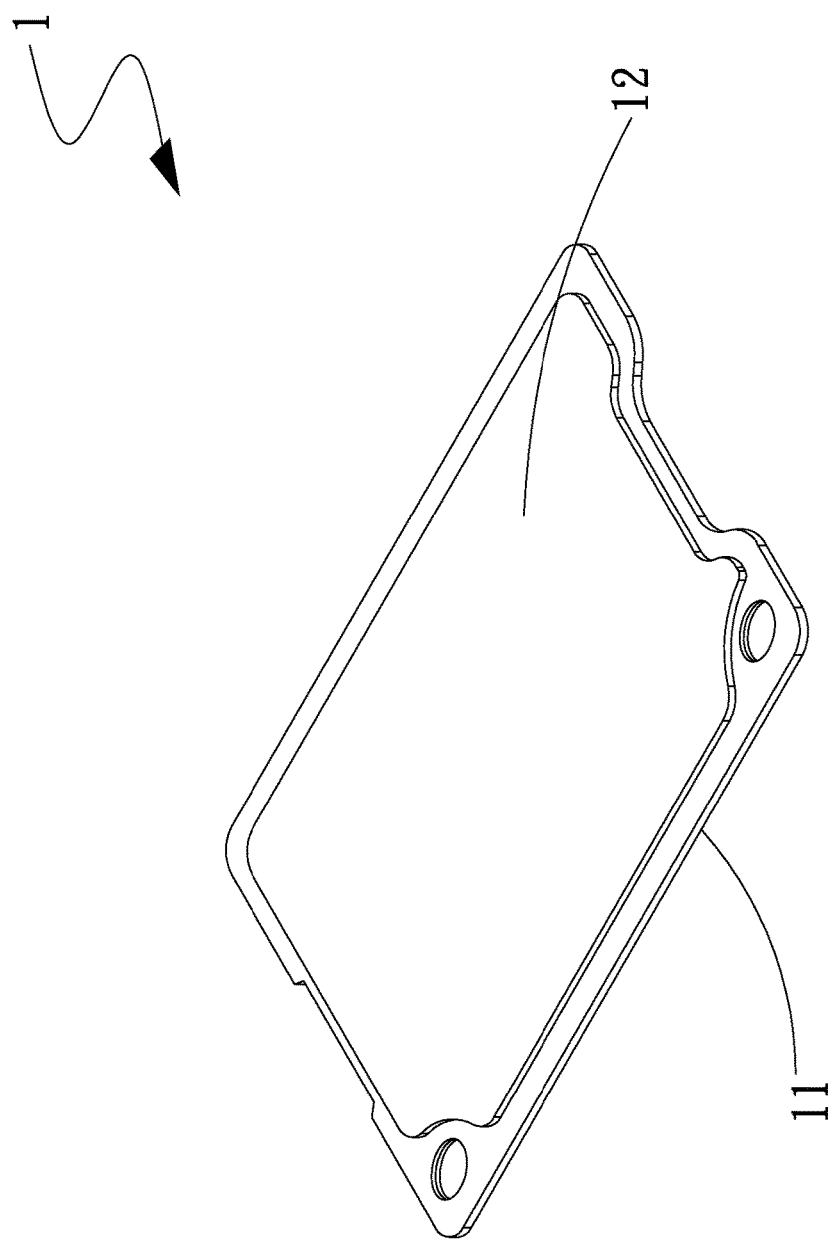
FIG. 2 is a perspective assembled view of the first embodiment of the vapor chamber structure of the present invention.
Figure 3A:
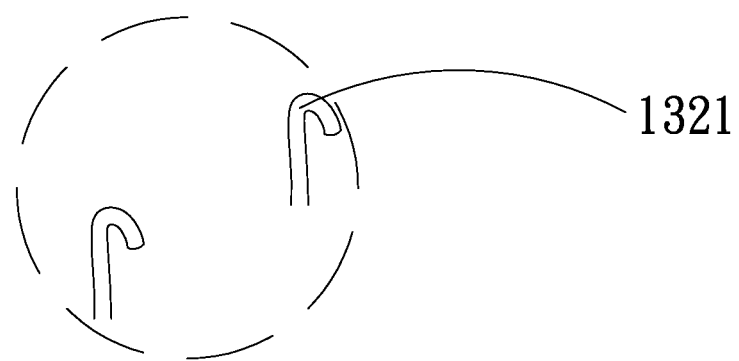
FIG. 3A is a perspective enlarged view of a part of the first embodiment of the vapor chamber structure of the present invention.
Figure 3B:
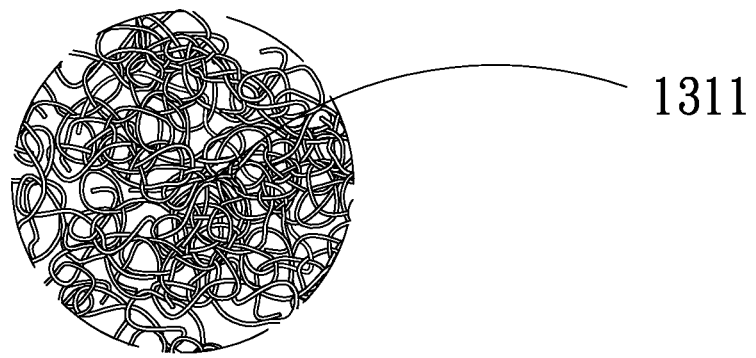
FIG. 3B is a perspective enlarged view of another part of the first embodiment of the vapor chamber structure of the present invention.
Figure 4A:
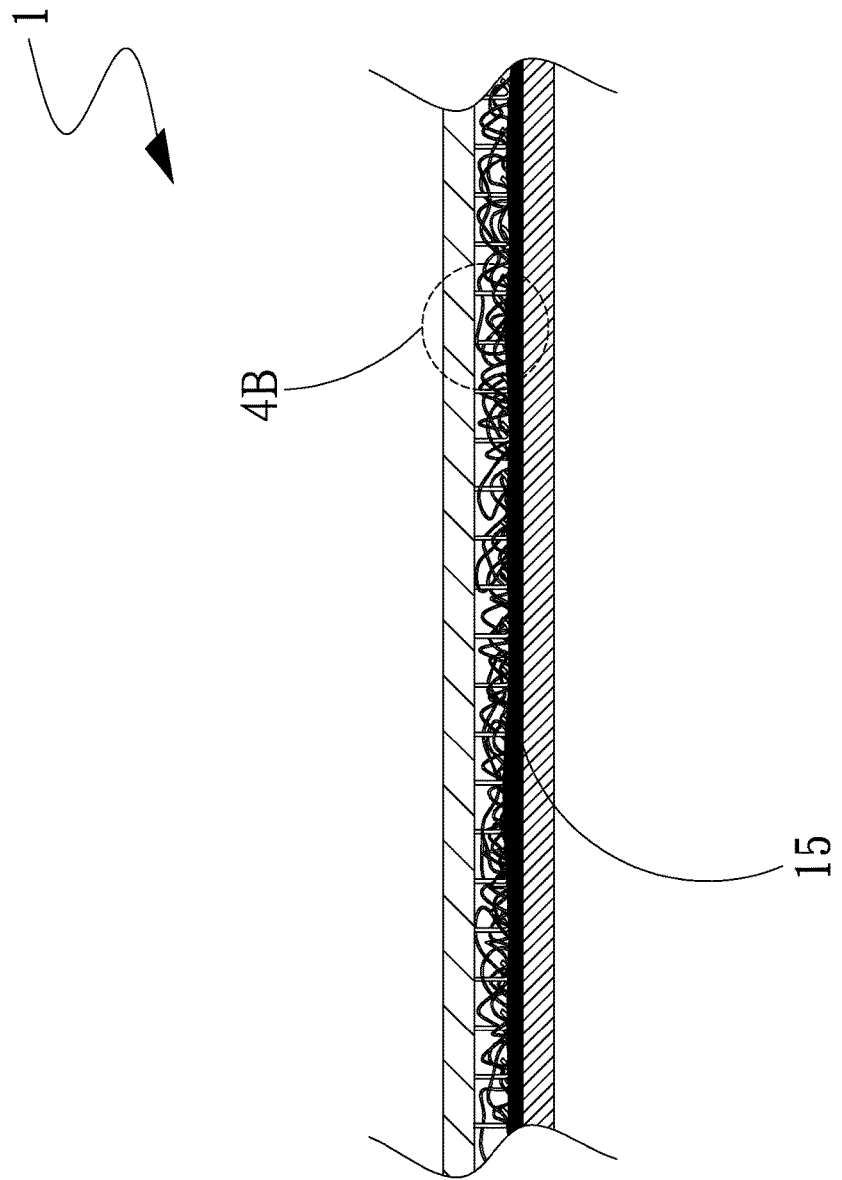
FIG. 4A is a sectional view of the first embodiment of the vapor chamber structure of the present invention.

Please refer to FIGS. 1, 2, 3A, 3B and 4A. FIG. 1 is a perspective exploded view of a first embodiment of the vapor chamber structure of the present invention. FIG. 2 is a perspective assembled view of the first embodiment of the vapor chamber structure of the present invention. FIG. 3A is a perspective enlarged view of a part of the first embodiment of the vapor chamber structure of the present invention. FIG. 3B is a perspective enlarged view of another part of the first embodiment of the vapor chamber structure of the present invention. FIG. 4A is a sectional view of the first embodiment of the vapor chamber structure of the present invention. As shown in the drawings, the vapor chamber structure 1 includes a first board body 11, a second board body 12 and a working fluid 15. The first board body 11 has a first face 111 and a second face 112. The second face 112 has a hooked section 131 composed of multiple loop bodies 1311 tangled with each other.

The second board body 12 is assembled and connected with the first board body 11. The second board body 12 has a third face 121 and a fourth face 122. The third face 121 is correspondingly mated and connected with the second face 112 of the first board body 11 to define a chamber 14. The working fluid 15 is filled in the chamber 14. A hook section 132 is disposed on the third face 121 of the second board body 12. The hook section 132 is composed of multiple hook-like hook bodies 1321 arranged in parallel to each other or unparallel to each other. The hook section 132 and the hooked section 131 can contact and hook and connect with each other. The top end of the hook section 132 can have an obtuse form or sharp form. In practice, the form of the top end of the hook section 132 is not limited to any specific form. Any form that can make the hook section 132 and the hooked section 131 hooked with each other pertains to the scope of the present invention.

The hooked section 131 and the hook section 132 are made of metal or nonmetal material. The first and second board bodies 11, 12 are made of a material selected from a group consisting of copper material, aluminum material, copper foil with graphite component and good heat conductor.

Figure 4B:
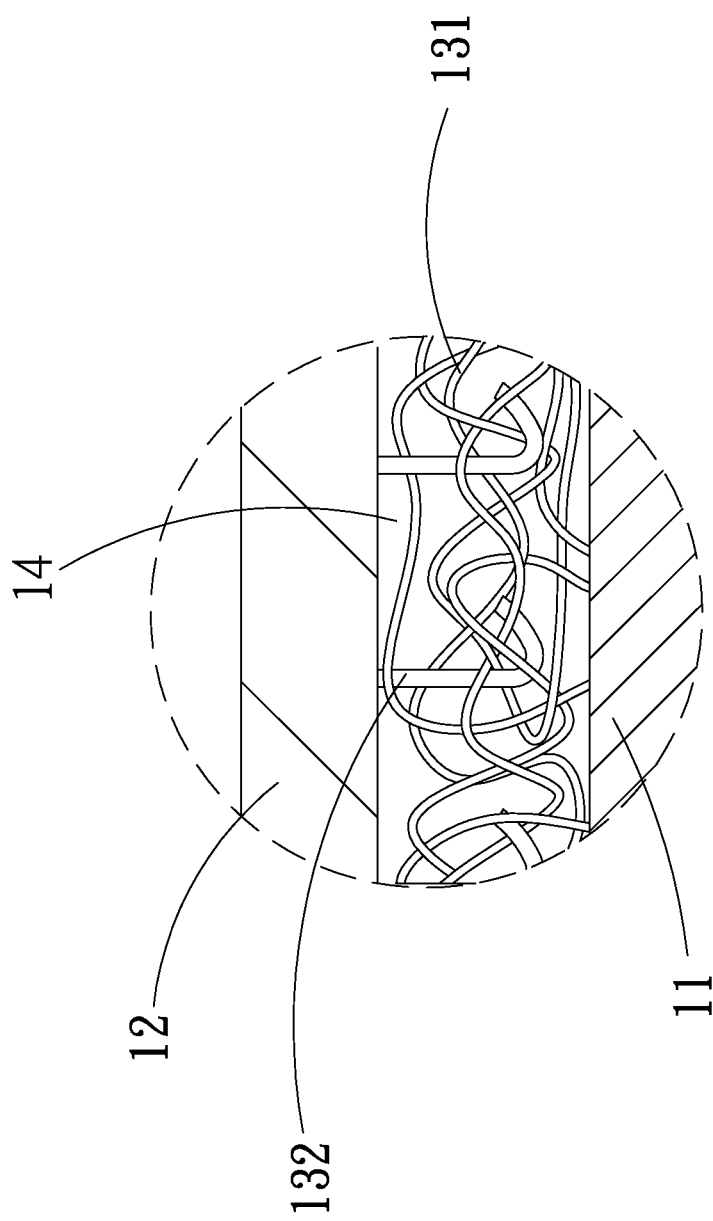
FIG. 4B is an enlarged view of circled area of FIG. 4A.

Please also refer to FIG. 4B. According to the structural design of the present invention, the hooked section 131 is directly formed on the second face 112 of the first board body 11 and defined as a capillary structure layer. The first face 111 of the first board body 11 can be attached to a heat source 2 and a vapor-liquid circulation of the working fluid 15 can be carried out in the chamber 14. Due to the structure of the hooked section 131, a stronger (better) liquid conservation power is provided to avoid dry burn of the vapor chamber structure 1. The hook section 132 is directly formed on the third face 121 of the second board body 12 as a support structure of the vapor chamber structure 1 of the present invention to provide support effect instead of the support structure in the conventional vapor chamber. Moreover, the condensed liquid-phase working fluid 15 on the third face 121 of the second board body 12 can be carried back to the second face 112 of the first board body 11. This can save the cost of the support structure of the conventional vapor chamber. Also, the free end of the hook section 132 has the form of a reverse hook so that the hook section 132 can contact and hook and connect with the hooked section 131 to provide a drag effect for the first and second board bodies 11, 12 to avoid thermal expansion problem taking place when the vapor chamber is heated.

Figure 5:
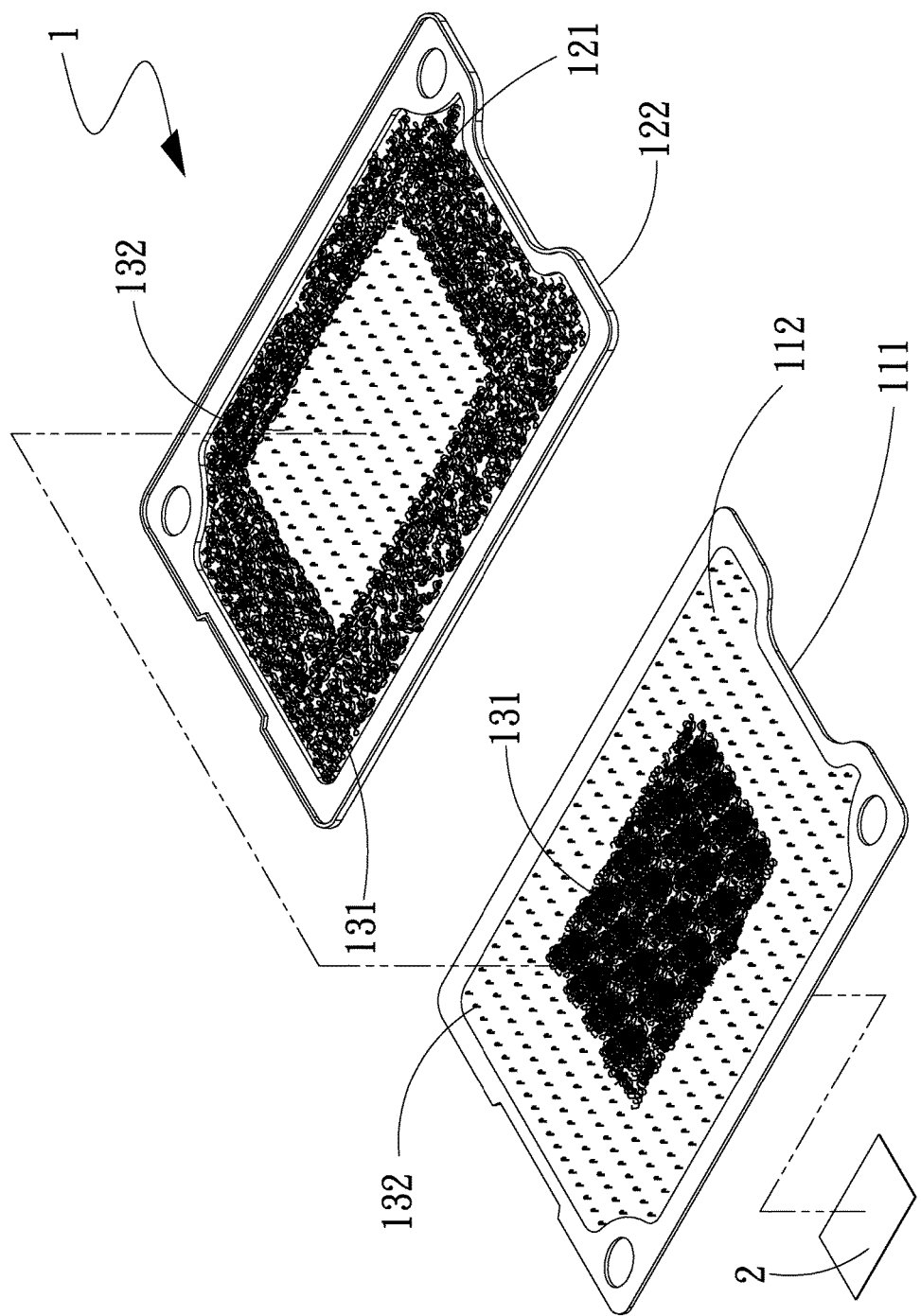
FIG. 5 is a perspective exploded view of a second embodiment of the vapor chamber structure of the present invention.

Please now refer to FIG. 5, which is a perspective exploded view of a second embodiment of the vapor chamber structure of the present invention. The second embodiment is partially identical to the first embodiment in structure and thus will not be repeatedly described hereinafter. The second embodiment is different from the first embodiment in that the second face 112 is formed with a hooked section 131 and a hook section 132 and the third face 121 is also formed with a hooked section 131 and a hook section 132. In other words, a central portion of the second face 112, (where the heat source 2 is positioned), has the hooked section 131, while the hook section 132 is formed on the rest portion of the second face 112. The hook section 132 and the hooked section 132 of the third face 121 respectively correspondingly contact and hook and connect with the hooked section 131 and the hook section 132 of the second face 112. This can achieve the same effect as the first embodiment.

Figure 6:
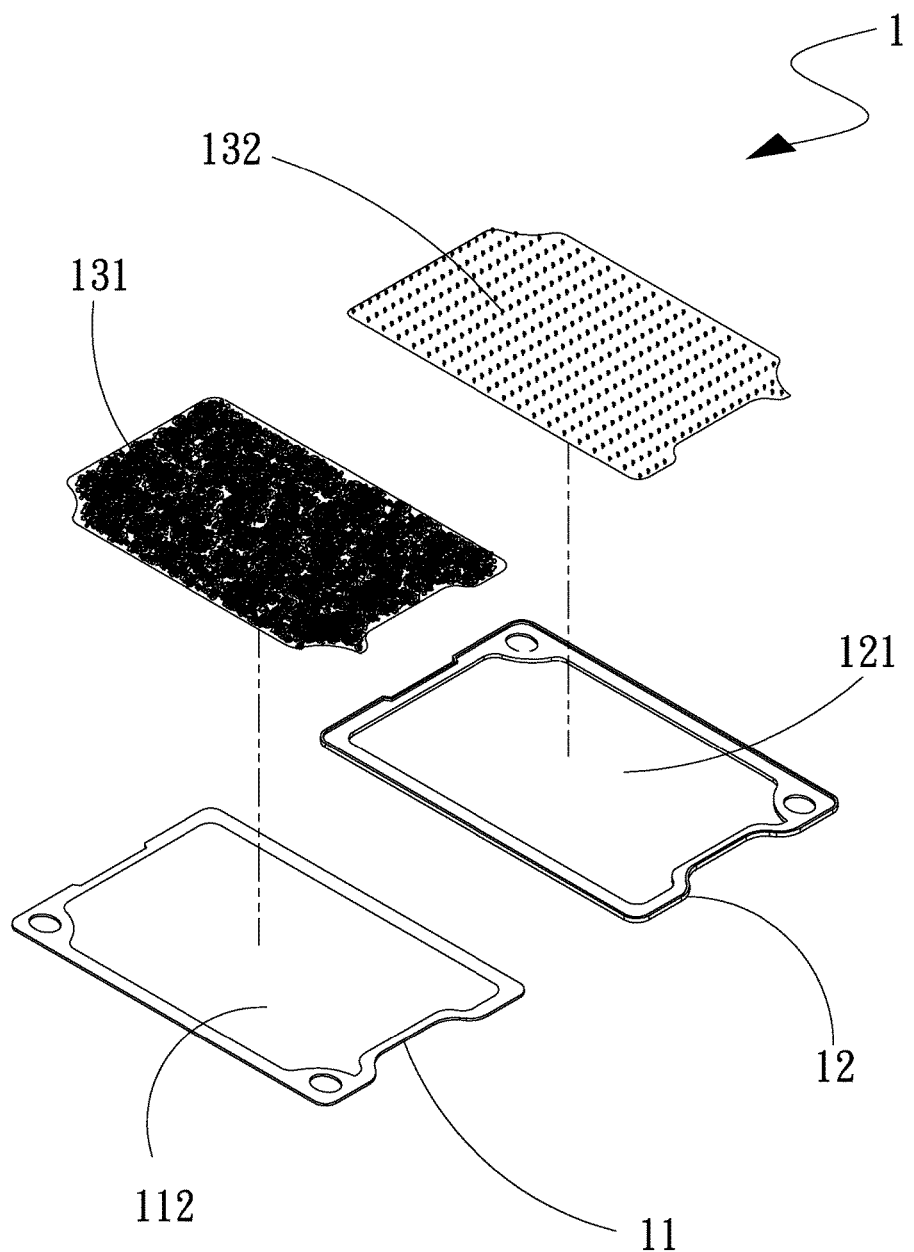
FIG. 6 is a perspective exploded view of a third embodiment of the vapor chamber structure of the present invention.

Please now refer to FIG. 6, which is a perspective exploded view of a third embodiment of the vapor chamber structure of the present invention. The third embodiment is partially identical to the first embodiment in structure and thus will not be repeatedly described hereinafter. The second embodiment is different from the first embodiment in that the hooked section 131 and the hook section 132 are premade structures. The hooked section 131 is attached to and overlaid on the second face 112 of the first board body 11. The hook section 132 is attached to and overlaid on the third face 121 of the second board body 12. The hook section 132 and the hooked section 131 contact each other and are hooked and connected with each other. The attachment manner is selected from a group consisting of welding, diffusion bonding, ultrasonic bonding, adhesion, gluing and lamination. Accordingly, the structure of the hooked section 131 and the structure of the hook section 132 can be securely attached to and overlaid on the first and second board bodies 11, 12. This can achieve the same effect as the first embodiment.

Figure 7:
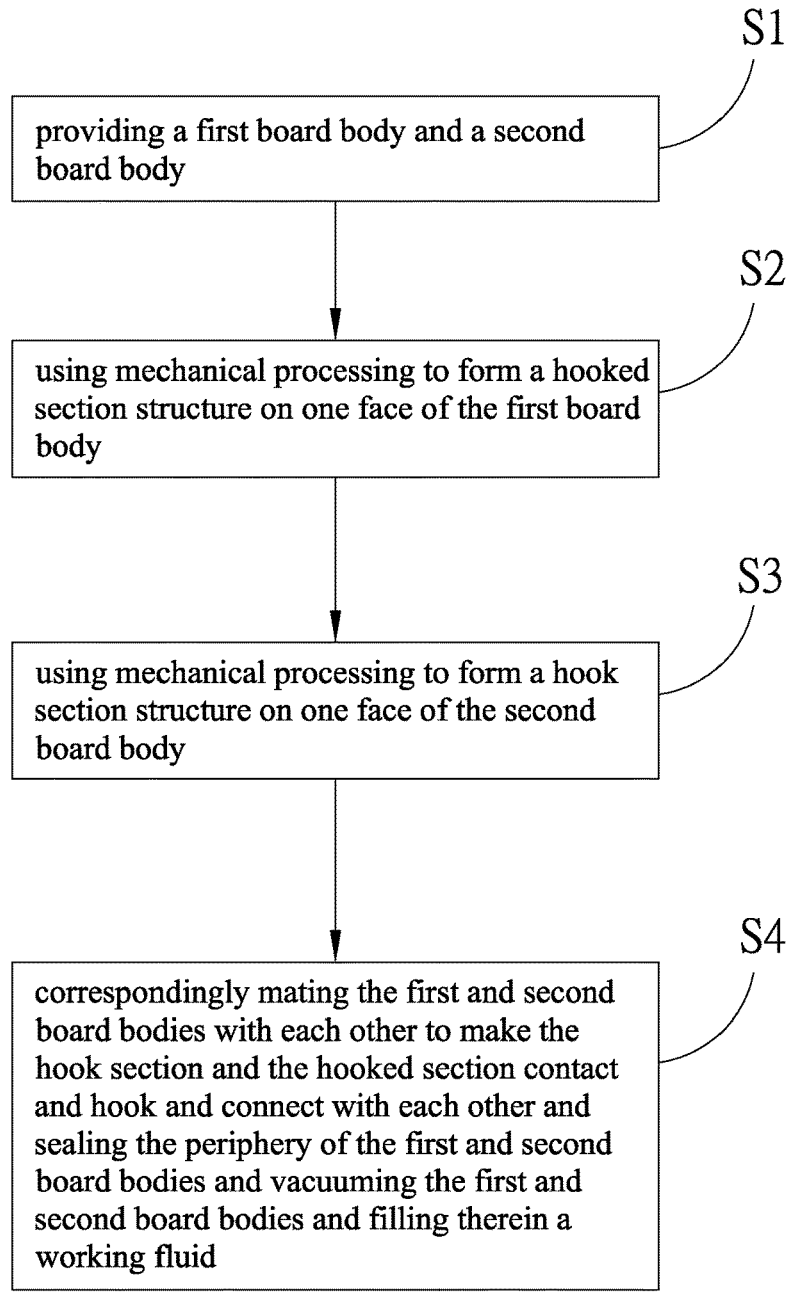
FIG. 7 is a flow chart of a first embodiment of the manufacturing method of the vapor chamber of the present invention.

Please now refer to FIG. 7, which is a flow chart of a first embodiment of the manufacturing method of vapor chamber of the present invention. As shown in the drawing, the manufacturing method of vapor chamber of the present invention includes steps of:

S1. providing a first board body and a second board body, a first board body 11 and a second board body 12 being provided, the first and second board bodies 11, 12 being made of a material selected from a group consisting of copper material, aluminum material, copper foil with graphite component and good heat conductor;

S2. using mechanical processing to form a hooked section structure on one face of the first board body, by means of mechanical processing, a hooked section structure 131 being directly formed on one face of the first board body 11, in this embodiment, the mechanical processing being selected from a group consisting of planing/milling processing, embossing processing, shoveling/filing processing and laser processing, the mechanical processing being not limited to the above processing manners, any of the processing manners that can make the hooked section structure 131 formed on one face of the first board body 11 pertaining to the scope of the present invention, the hooked section 131 being composed of multiple loop bodies 1311;

S3. using mechanical processing to form a hook section structure on one face of the second board body, by means of mechanical processing, a hook section structure 132 being directly formed on one face of the second board body 12, in this embodiment, the mechanical processing being selected from a group consisting of planing/milling processing, embossing processing, shoveling/filing processing and laser processing, the mechanical processing being not limited to the above processing manners, any of the processing manners that can make the hook section structure 132 formed on one face of the second board body 12 pertaining to the scope of the present invention, the hook section 132 being composed of multiple hook-like hook bodies 1321 arranged in parallel to each other or unparallel to each other, the top end of the hook section 132 having an obtuse form or sharp form; and S4. correspondingly mating the first and second board bodies with each other to make the hook section and the hooked section contact and hook and connect with each other and sealing the periphery of the first and second board bodies and vacuuming the first and second board bodies and filling therein a working fluid, the first and second board bodies 11, 12 being correspondingly mated with each other to make the hook section 132 and the hooked section 131 contact and hook and connect with each other, the periphery of the first and second board bodies 11, 12 being then sealed, the first and second board bodies 11, 12 being then vacuumed, a working fluid 15 being finally filled therein.

According to the manufacturing method of vapor chamber of the present invention, the hooked section structure 131 is directly formed on the first board body 11, while the hook section structure 132 is directly formed on the second board body 12 as a support structure of the vapor chamber structure 1 of the present invention to provide support effect instead of the support structure in the conventional vapor chamber. In this case, the cost is greatly saved and the vapor chamber can be thinned. In addition, the hook section 132 can contact and hook and connect with the hooked section 131 to provide a drag effect for the first and second board bodies 11, 12 to avoid thermal expansion problem taking place when the vapor chamber is heated.

Figure 8:
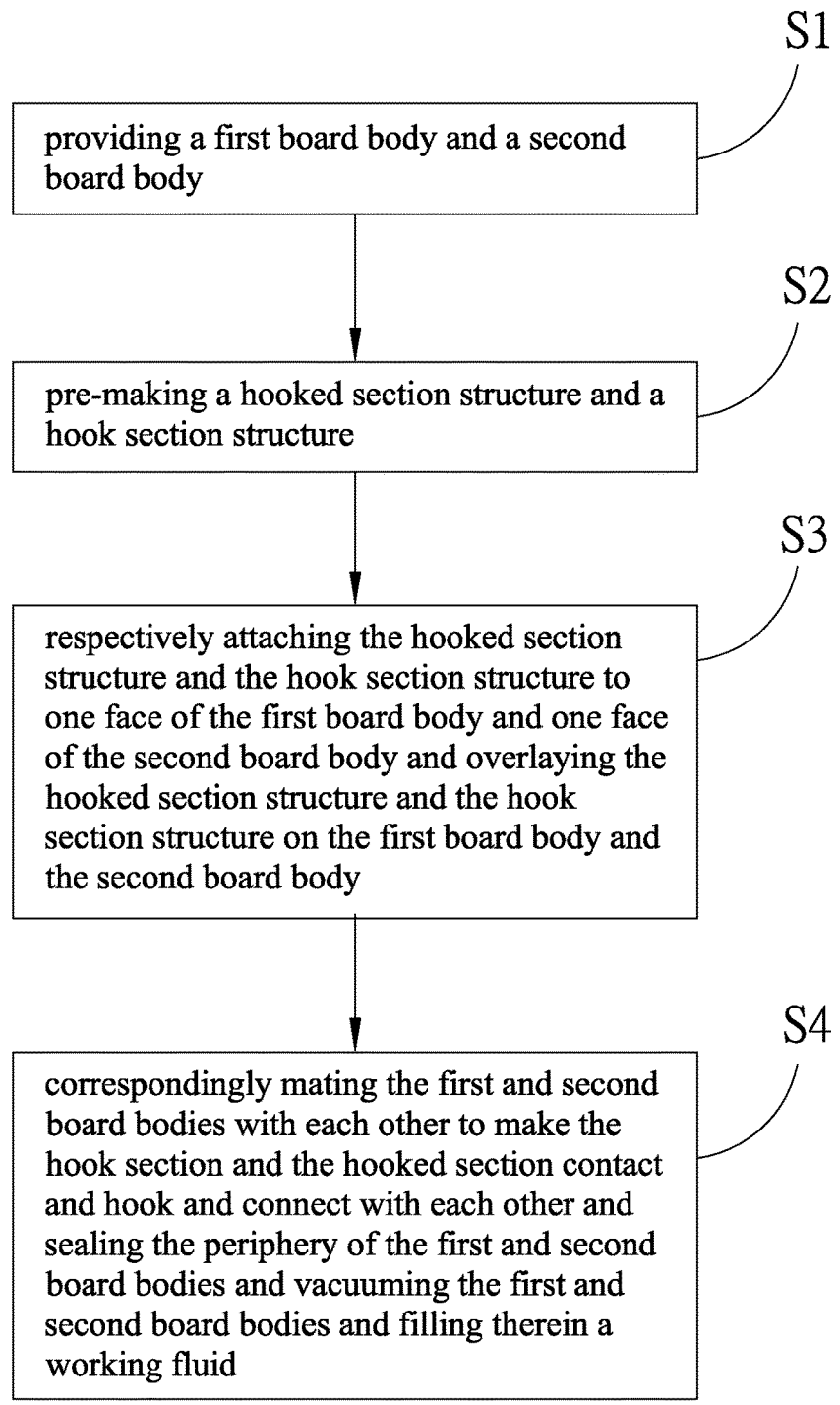
FIG. 8 is a flow chart of a second embodiment of the manufacturing method of the vapor chamber of the present invention.

Please now refer to FIG. 8, which is a flow chart of a second embodiment of the manufacturing method of vapor chamber of the present invention. As shown in the drawing, the manufacturing method of vapor chamber of the present invention includes steps of:

S1. providing a first board body and a second board body, a first board body 11 and a second board body 12 being provided, the first and second board bodies 11, 12 being made of a material selected from a group consisting of copper material, aluminum material, copper foil with graphite component and good heat conductor;

S2. pre-making a hooked section structure and a hook section structure, a hooked section structure 131 and a hook section structure 132 being premade, the hooked section 131 being composed of multiple loop bodies 1311, the hook section 132 being composed of multiple hook-like hook bodies 1321 arranged in parallel to each other or unparallel to each other, the top end of the hook section 132 having an obtuse form or sharp form;

S3. respectively attaching the hooked section structure and the hook section structure to one face of the first board body and one face of the second board body and overlaying the hooked section structure and the hook section structure on the first board body and the second board body, the hooked section structure 131 and the hook section structure 132 being respectively attached to and overlaid on one face of the first board body 11 and one face of the second board body 12, the attachment manner being selected from a group consisting of welding, diffusion bonding, adhesion, ultrasonic bonding, gluing and lamination, whereby the structure of the hooked section 131 and the structure of the hook section 132 can be securely attached to and overlaid on the faces of the first and second board bodies 11, 12, in this embodiment, the attachment manner being not limited to the above attachment manners, any of the attachment manners that can make the hooked section structure 131 and the hook section structure 132 attached to and overlaid on the first and second board bodies 11, 12 pertaining to the scope of the present invention; and S4. correspondingly mating the first and second board bodies with each other to make the hook section and the hooked section contact and hook and connect with each other and sealing the periphery of the first and second board bodies and vacuuming the first and second board bodies and filling therein a working fluid, the first and second board bodies 11, 12 being correspondingly mated with each other to make the hook section 132 and the hooked section 131 contact and hook and connect with each other, the periphery of the first and second board bodies 11, 12 being then sealed, the first and second board bodies 11, 12 being then vacuumed, a working fluid 15 being finally filled therein.

The second embodiment of the manufacturing method of vapor chamber of the present invention can achieve the same effect as the first embodiment.

In conclusion, in comparison with the conventional vapor chamber, the present invention has the following advantages:

1. No additional support structure is needed.
2. The vapor chamber can be thinned.
3. The manufacturing cost is greatly lowered.
4. The thermal expansion is avoided.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of vapor chamber, comprising steps of:
   providing a first board body and a second board body;
   using mechanical processing to form a hooked section structure on one face of the first board body, the hooked section structure being defined as a capillary structure layer;
   using mechanical processing to form a hook section structure as a support structure on one face of the second board body; and
   correspondingly mating the first and second board bodies with each other to form a chamber, and make the hook section and the hooked section contact and hook and connect with each other and sealing the periphery of the first and second board bodies and vacuuming the first and second board bodies and filling therein a working fluid, so as to form a vapor chamber with a vacuum chamber and sealed periphery, such that the hook section contacts, hooks and connects with the hooked section to provide a drag effect for the first and second board bodies to avoid a thermal expansion problem taking place when the vapor chamber is heated.

2. The manufacturing method of vapor chamber as claimed in claim 1, wherein the mechanical processing is selected from a group consisting of planing/milling processing, embossing processing, shoveling/filing processing and laser processing.

3. The manufacturing method of vapor chamber as claimed in claim 1, wherein the hooked section is composed of multiple loop bodies.

4. A manufacturing method of vapor chamber, comprising steps of:
   providing a first hoard body and a second hoard body;
   pre-making a hooked section structure and a hook section structure, the hooked section structure being defined as a capillary structure layer, the hook section structure defined as a support structure;
   respectively attaching the hooked section structure and the hook section structure to one face of the first board body and one face of the second hoard body and overlaying the hooked section structure and the hook section structure on the first board body and the second board body; and
   correspondingly mating the first and second board bodies with each other to form a chamber, and make the hook section and the hooked section contact and hook and connect with each other and sealing the periphery of the first and second board bodies and vacuuming the first and second board bodies and filling therein a working fluid, so as to form a vapor chamber with a vacuum chamber and sealed periphery, such that the hook section contacts, hooks and connects with the hooked section to provide a drag effect for the first and second board bodies to avoid a thermal expansion problem taking place when the vapor chamber is heated.

5. The manufacturing method of vapor chamber as claimed in claim 4, wherein the attachment manner is selected from a group consisting of welding, diffusion bonding, adhesion, ultrasonic bonding, gluing and lamination.

6. The manufacturing method of vapor chamber as claimed in claim 4, wherein the hooked section structure is composed of multiple loop bodies.

* * * * *